US012795411B2

(12) United States Patent
Aoyagi

(10) Patent No.: US 12,795,411 B2
(45) Date of Patent: Nov. 10, 2026

(54) PROVIDING SIMULATION NETWORK THAT SIMULATES REAL MOBILE COMMUNICATION NETWORK

(71) Applicant: RAKUTEN MOBILE, INC., Tokyo (JP)

(72) Inventor: Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 350 days.

(21) Appl. No.: 18/571,725

(22) PCT Filed: Mar. 30, 2023

(86) PCT No.: PCT/JP2023/013124
§ 371 (c)(1),
(2) Date: Dec. 19, 2023

(87) PCT Pub. No.: WO2024/161666
PCT Pub. Date: Aug. 8, 2024

(65) Prior Publication Data

US 2025/0088875 A1 Mar. 13, 2025

(30) Foreign Application Priority Data

Feb. 3, 2023 (JP) ................................ 2023-015626

(51) Int. Cl.
*H04W 24/06* (2009.01)
*H04L 41/14* (2022.01)
(Continued)

(52) U.S. Cl.
CPC ........... *H04W 24/06* (2013.01); *H04L 41/145* (2013.01); *H04L 41/16* (2013.01); *H04W 48/08* (2013.01)

(58) Field of Classification Search
CPC ..... H04W 24/06; H04W 48/08; H04W 24/02; H04L 41/145; H04L 41/16; H04L 41/14
See application file for complete search history.

(56) References Cited

U.S. PATENT DOCUMENTS

| | | | | |
|---|---|---|---|---|
| 5,432,934 A | 7/1995 | Levin et al. | | |
| 2006/0140125 A1* | 6/2006 | Ottinger | H04W 16/22 | 370/310 |

(Continued)

FOREIGN PATENT DOCUMENTS

WO WO-2017139879 A1 * 8/2017 ............... G09B 9/02

OTHER PUBLICATIONS

Series Y: Global Information Infrastructure, Internet Protocol Aspects, Next Generation Networks, Internet of Things and Smart Cities, Digital twin network—Requirements and architecture, ITU-T Telecommunication standardization sector of ITU, Y.3090, Feb. 2022; 24pp.

*Primary Examiner* — Tejis Daya
(74) *Attorney, Agent, or Firm* — HAUPTMAN HAM, LLP

(57) ABSTRACT

A communication control apparatus includes at least one processor that performs: by a simulation network provider, providing a simulation network that simulates a real mobile communication network; and by a network operation information provider, providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

18 Claims, 3 Drawing Sheets

(51) Int. Cl.
*H04L 41/16* (2022.01)
*H04W 48/08* (2009.01)

(56) References Cited

U.S. PATENT DOCUMENTS

2010/0132027 A1 5/2010 Ou
2012/0150521 A1* 6/2012 Balkwill ............... H04W 16/22 703/13
2016/0029221 A1* 1/2016 Suarez Garcia .... H04W 12/128 455/410
2016/0212634 A1* 7/2016 Flanagan .............. H04W 24/02
2020/0389387 A1* 12/2020 Magzimof .............. H04L 45/16
2020/0394554 A1* 12/2020 Gautam ................. G06N 20/00
2021/0168643 A1 6/2021 Yao et al.
2021/0248447 A1* 8/2021 Rickard ............... G06N 3/0442

* cited by examiner

PROVIDING SIMULATION NETWORK THAT SIMULATES REAL MOBILE COMMUNICATION NETWORK

RELATED APPLICATIONS

The present application is a National Phase of International Application Number PCT/JP2023/013124, filed Mar. 30, 2023, and claims priorities based on Japanese Patent Application No. 2023-015626, filed Feb. 3, 2023.

BACKGROUND OF THE INVENTION

1. Field of the Invention

The present disclosure relates to providing simulation network that simulates real mobile communication network.

2. Description of the Related Art

The number, types, and applications of wireless communication devices (hereinafter also collectively referred to as communication device(s)), represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Patent Literature 1: US Patent Application Publication 2021/0168643

SUMMARY OF THE INVENTION

The 5GC (Fifth Generation Core), which is the core network of 5G, is provided with the NEF (Network Exposure Function) that provides an application programming interface (API) to various internal functions. Since the NEF can be accessed by third parties, the information that can be acquired from within the 5GC through the NEF is naturally limited from the perspective of security or confidentiality in mobile communication networks.

The present disclosure was made in consideration of such situation, and it provides a communication control apparatus and the like that can provide a simulation network that simulates a real mobile communication network.

A communication control apparatus in a certain aspect of the present disclosure includes at least one processor that performs: by a simulation network provider, providing a simulation network that simulates a real mobile communication network; and by a network operation information provider, providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

According to the present aspect, the first interface is provided that allows access by the operator of the real mobile communication network and the operator of the simulation network, and restricts access by the participant in the simulation network who is different from each of the operators. The highly confidential network operation information in the real mobile communication network is securely provided to the simulation network through the first interface to which access by the participant in the simulation network is restricted. Thus, the simulation network can simulate the real mobile communication network, based on the network operation information provided from the real mobile communication network through the first interface.

Another aspect of the present disclosure is a communication control method. The communication control method performs: providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

Further another aspect of the present disclosure is a computer-readable medium. The computer-readable medium stores a communication control program causing a computer to perform: providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

In addition, any combination of the above components, and any conversion of the expression of the present disclosure among methods, devices, systems, storage media, computer programs and the like are also encompassed within the present disclosure.

According to the present disclosure, a simulation network that simulates a real mobile communication network can be provided.

DETAILED DESCRIPTION OF THE INVENTION

Figure 1:
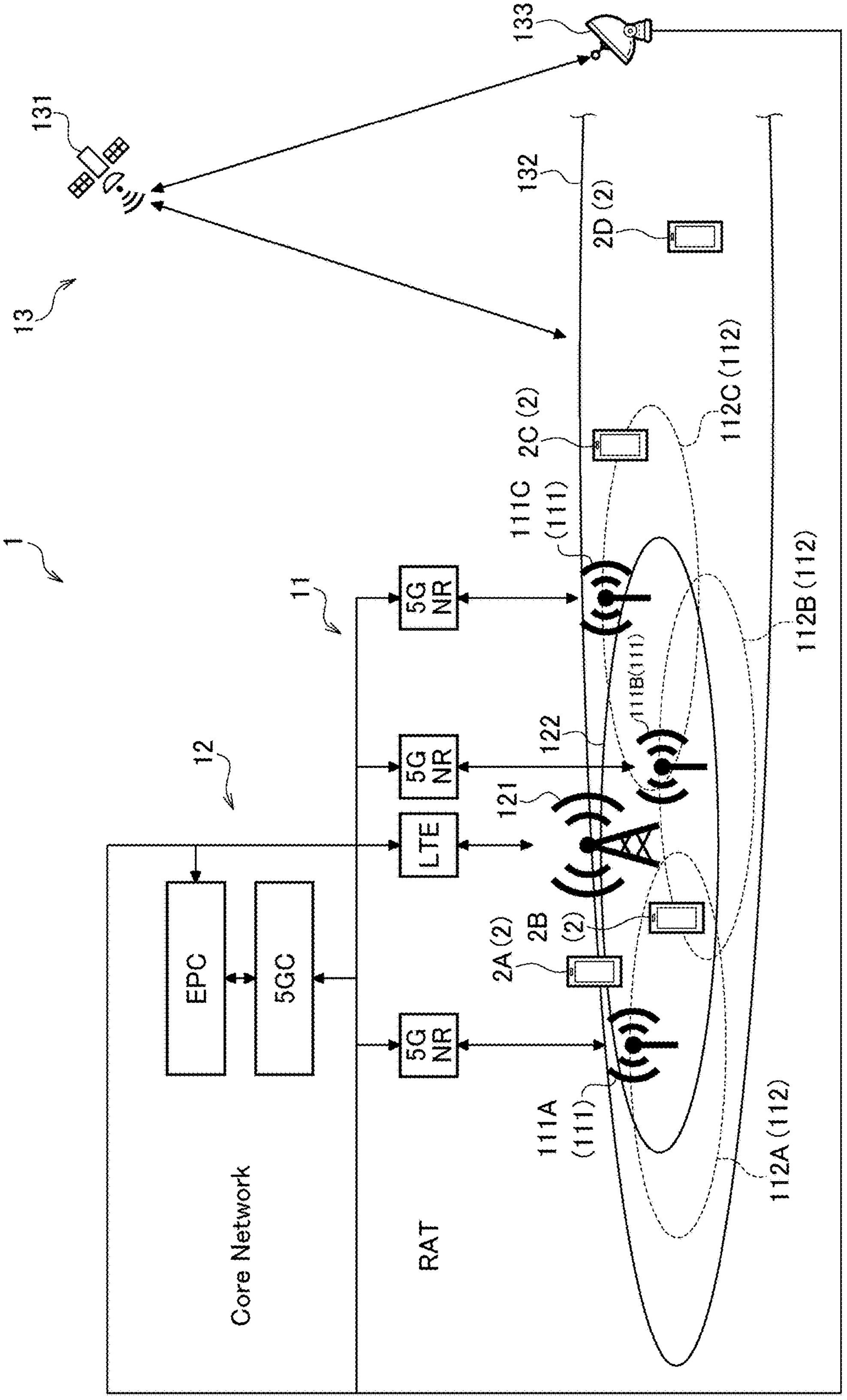
FIG. 1 schematically shows the overview of a wireless communication system to which the communication control apparatus is applied.

The following is a detailed description of ways for implementing the present disclosure (hereinafter also referred to as embodiment), with reference to the drawings. In the description and/or the drawings, identical or equivalent components, parts, processes, and the like will be given the same symbol and duplicate descriptions will be omitted. The scale or shape of each portion shown in the drawings is set for convenience in order to simplify the description, and is not to be construed as limiting unless otherwise mentioned. The embodiments are illustrative and will not limit the coverage of the present disclosure in any way. Not all features presented in the embodiments or combinations thereof are necessarily essential to the present disclosure. For convenience, the embodiments are presented broken down into each component to realize each function and/or each group of functions. However, one component in an embodiment may actually be realized by a combination of a plurality of separate components, or a plurality of components in an embodiment may actually be realized by a single united component.

The communication control apparatus according to the present embodiment can be applied to any networks such as a terrestrial network (TN) constructed by terrestrial communication cells provided on the ground by terrestrial base stations installed on the ground, a non-terrestrial network (NTN) constructed by non-terrestrial communication cells provided on the ground by flying non-terrestrial base stations, or a network where a TN and an NIN coexist. Such base stations and/or communication cells may belong to the same mobile communication network, Public Land Mobile Network (PLMN), Mobile Network Operator (MNO) and/or Mobile Virtual Network Operator (MVNO), or belong to different mobile communication networks, PLMNs, MNOs and/or MVNOs. In the following, mobile communication networks, PLMNs, MNOs and MVNOs are collectively referred to as PLMNS.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network (CN). 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is responsible for satellite communication via communication satellite 131. Although not shown in the figure, the wireless communication system 1 may include wireless communication networks of a generation prior to 4G, a generation later than 5G (e.g., 6G), or any wireless communication networks that are not associated with generations, such as Wi-Fi (registered trademark). Besides, the wireless communication system 1 may not include some or all of the 5G wireless communication system 11, the 4G wireless communication system 12, and the satellite communication system 13.

The 5G wireless communication system 11 may include a plurality of 5G base stations 111A, 111B, and 111C (hereinafter also collectively referred to as 5G base station 111) installed on the ground capable of communicating by 5G NR with communication devices 2A, 2B, 2C, and 2D (hereinafter also collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter also collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1). The plurality of 4G base stations 121 are installed on the ground and can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station

121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and/or the 4G base station 121 as terrestrial base stations that constitute the terrestrial network (TN), via 5G NR and/or LTE as the respective radio access technologies or other wired or wireless access technologies or interfaces. In such a way, the gateway 133 connects the non-terrestrial network (NTN), which includes the communication satellite 131 as a non-terrestrial base station or a satellite base station, and the terrestrial network (TN), which includes terrestrial base station 111, 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a way, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft or a drone flying in stratosphere or other lower (e.g., about 20 km above the ground) atmosphere may be used as a non-terrestrial base station in addition to or instead of the communication satellite 131.

Figure 2:
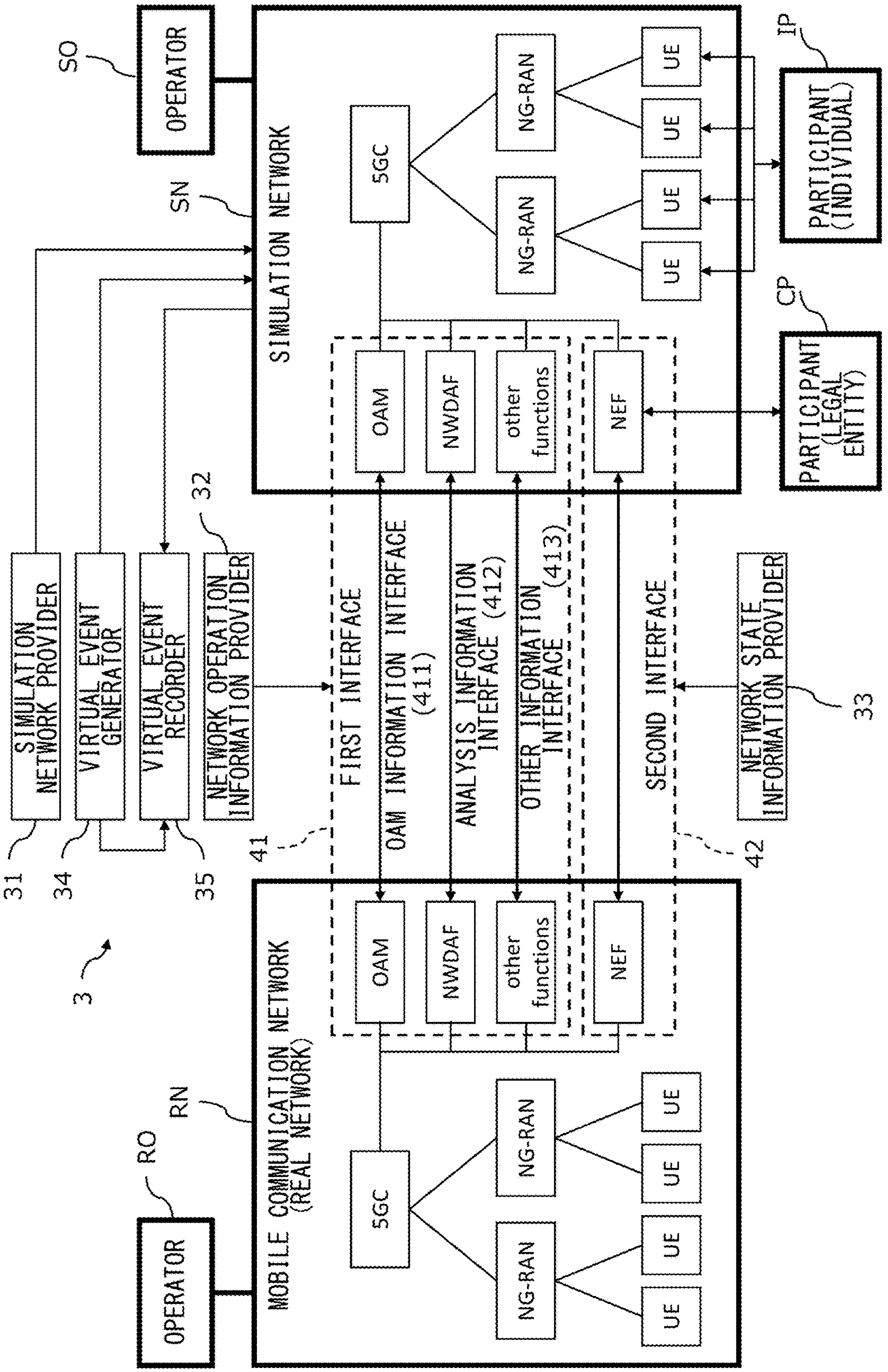
FIG. 2 is a schematic functional block diagram of the communication control apparatus.

FIG. 2 is a functional block diagram schematically showing the communication control apparatus 3 according to the present embodiment. The communication control apparatus 3 includes a simulation network provider 31, a network operation information provider 32, a network state information provider 33, a virtual event generator 34, and a virtual event recorder 35. Some of such functional blocks can be omitted as long as the communication control apparatus 3 realizes at least some of the operations and/or effects described below. Such functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the present embodiment, some or all of functional blocks of the communication control apparatus 3 may be realized in a centralized or distributed manner by computer and/or processor provided in the communication device 2 (UE), the RAN including the base station 111, 121, 131 (the 5G-compliant NG-RAN (Next Generation RAN) in the illustrated example), the gateway 133, or the core network (the 5G-compliant 5GC in the illustrated example), in the real network RN and/or the simulation network SN described below.

In the present embodiment, a real network RN, which is a real mobile communication network, and a simulation network SN, which simulates the real network RN, are provided. The real network RN is operated by a real network operator RO, which is a real mobile communication operator such as an MNO or an MVNO (hereinafter also referred to as a real operator). The real network RN in the illustrated example is a 5G network similar to the 5G wireless communication system 11 in FIG. 1, which uses a 5G-compliant NG-RAN as the RAN and a 5G-compliant 5GC as the core network. However, the real network RN may be a 4G network similar to the 4G wireless communication system 12 in FIG. 1, a satellite communication network similar to the satellite communication system 13 in FIG. 1, or a mobile communication network constituted by any combination thereof.

The simulation network SN provided by the simulation network provider 31 is a mobile communication network that simulates the real network RN, which is a real mobile communication network. For example, the simulation network SN may be a typically small mobile communication network actually constructed to simulate the real network RN, or may be a virtual network virtually constructed mainly by software on general-purpose hardware.

Here, the simulation network SN may be referred to as a virtual network regardless of its construction type, since it is a virtual mobile communication network whose main purpose is to simulate the real network RN, unlike the real network RN that provides real communication service to a UE. However, as mentioned above, the term of so-called "virtual network" may only indicate a network constructed virtually mainly by software on general-purpose hardware. In order to avoid such a limited interpretation, the term "simulation network" is used instead in the present embodiment. As such, the simulation network SN in the present embodiment includes not only the so-called "virtual network" but also typically small mobile communication network built in reality to simulate the real network RN. Besides, the real network RN may be constructed as the so-called "virtual network". It should be noted that the simulation network SN may be a network constructed virtually in a virtual space such as the Metaverse. Such a simulation network SN functions as a digital twin of the real network RN, since it is a digital copy of the real network RN in the virtual space.

In the illustrated example where the real network RN is a 5G network, a virtual 5G network simulating it is constructed as the simulation network SN. As such, the simulation network SN may include the UE, the NG-RAN, and the 5GC similarly to the real network RN. The simulation network SN is operated by a simulation network operator (hereinafter also referred to as simulation operator) SO. The simulation operator SO may be the same mobile communication operator as the real operator RO, a mobile communication operator different from the real operator RO or any other operator, or a public agency such as country or local government different from the real operator RO. It should be noted that, as described below, since highly confidential network operation information concerning the real network RN and/or the real operator RO is provided to the simulation network SN, it is preferable that one or a few operators who can guarantee security or confidentiality are carefully selected as the simulation operators SO different from the real operator RO.

The network operation information provider 32 provides network operation information used for operation of the simulation network SN, from the real network RN to the simulation network SN, through a first interface 41 to which access by an operator of the real network RN (the real operator RO) and an operator of the simulation network SN (the simulation operator SO) is allowed, and access by a participant in the simulation network SN who is different from each of the operators (e.g., the corporate participant CP or the individual participant IP described below) is restricted. The network operation information provider 32 may provide the network operation information used for operation of the real network RN, through the first interface 41 from the simulation network SN to the real network RN. The first interface 41 in such a case is a bidirectional interface that can share the network operation information between the real network RN and the simulation network SN.

Such a unidirectional (from the real network RN to the simulation network SN) or bidirectional first interface 41 can be accessed, for example, only by the real operator RO and the simulation operator SO for inputting and/or outputting various information, while cannot be accessed (i.e., access is prohibited) by the participant in the simulation network SN. The first interface 41 includes, for example, an OAM information interface 411, an analysis information interface 412, and other information interface 413. Such interfaces 411-413 may be provided individually for each corresponding function described below, or may be integrated into one or a few interfaces.

The OAM information interface 411 provides OAM information in the real network RN as the network operation information, from the real network RN to the simulation network SN. The OAM information interface 411 in the bidirectional first interface 41 may provide the OAM information in the simulation network SN, from the simulation network SN to the real network RN.

The OAM information interface 411 connects the OAM function that belongs to the 5GC in the real network RN and the OAM function that belongs to the 5GC in the simulation network SN. The OAM (Operations, Administration, and Maintenance) function in each 5GC is realized by one or more network functions (NF) and/or service functions (SF) (hereinafter collectively referred to as functions) responsible for operations, administration, and maintenance of each 5G network. Examples of such OAM functions include Session Management Function (SMF) responsible for session management, and User Plane Function (UPF) responsible for user data transfer and the like.

Examples of the OAM information in the real network RN and/or the simulation network SN that can be shared between the real network RN and the simulation network SN through the OAM information interface 411 includes signaling load, data traffic volume, service quality, delay (or latency) time, jitter, throughput and other performance information. Besides, basic configuration information or equipment setting information of a network as basis of the OAM function, may be shared between the real network RN and the simulation network SN, through the OAM information interface 411 or the other information interface 413.

Such various OAM information, network configuration information, or equipment setting information, which is highly confidential network operation information especially for the real operator RO, can be securely provided to the simulation network SN, through the first interface 41 (the OAM information interface 411 and/or the other information interface 413), to which access by a general participant in the simulation network SN is restricted or prohibited. Then, the simulation network SN can effectively simulate the real network RN by utilizing various network operation information in the real network RN received securely through the first interface 41.

The analysis information interface 412 provides analysis information in the real network RN as the network operation information, from the real network RN to the simulation network SN. The analysis information interface 412 in the bidirectional first interface 41 may provide the analysis information in the simulation network SN, from the simulation network SN to the real network RN.

The analysis information interface 412 connects the analysis function that belongs to the 5GC in the real network RN and the analysis function that belongs to the 5GC in the simulation network SN. The analysis functions in the real network RN and the simulation network SN may be service functions such as the NWDAF that can be configured by artificial intelligence having machine learning capability. It should be noted that the substantial analysis function such as the NWDAF may be provided in either of the real network RN and the simulation network SN (preferably in the real network RN) so that the analysis in the real network RN and the simulation network SN is performed centrally (or in one place). The result of such consistent analysis is preferably shared between the real network RN and the simulation network SN, through the analysis information interface 412.

The NWDAF (Network Data Analytics Function) is an example of an Artificial Intelligence (AI)/Machine Learning (ML) function responsible for collecting and analyzing data on a mobile communication network. The NWDAF collects and accumulates activity history information or measurement information of, for example, a large number of communication devices 2 (UEs) or communication stations (e.g., base stations) connected to a mobile communication network (the real network RN and/or the simulation network SN in the present embodiment). By analyzing such vast amount of information, the NWDAF can grasp or estimate the state of a mobile communication network, the connection state or the communication state of a user, or the like. It should be noted that, although it is assumed that similar functions to the NWDAF may be provided under different names in other wireless communication systems, including those of generations later than 5G, such similar functions may be utilized in the present embodiment instead of or in addition to the NWDAF.

The analysis information generated by the analysis function such as the NWDAF in the real network RN, which is highly confidential network operation information for the real operator RO, similarly to the above mentioned OAM information, network configuration information, equipment setting information, and the like, can be securely provided to the simulation network SN, through the first interface 41 (the analysis information interface 412), to which access by a general participant in the simulation network SN is restricted or prohibited. Then, the simulation network SN can effectively simulate the real network RN by utilizing analysis information in the real network RN received securely through the first interface 41.

The other information interface 413 provides information concerning various functions in the real network RN as the network operation information, from the real network RN to the simulation network SN. The other information interface 413 in the bidirectional first interface 41 may provide the information concerning various functions in the simulation network SN, from the simulation network SN to the real network RN.

The other information interface 413 connects various functions that belong to the 5GC in the real network RN (other network functions and/or service functions that are not classified as the OAM function or the analysis function such as the NWDAF described above), and various functions that belong to the 5GC in the simulation network SN. The simulation network SN can effectively simulate the real network RN by utilizing information concerning various functions in the real network RN received securely through the first interface 41 (the other information interface 413), to which access by a general participant in the simulation network SN is restricted or prohibited.

The network state information provider 33 may provide network state information other than the network operation information (the information shared on the first interface 41) that simulates the state in the real network RN in the simulation network SN, through a second interface 42 to which access by a participant in the simulation network SN is allowed, from the real network RN to the simulation network SN. The network state information provider 33 may provide the network state information indicating the state in the simulation network SN, through the second interface 42 from the simulation network SN to the real network RN. The second interface 42 in such a case is a bidirectional interface that can share the network state information between the real network RN and the simulation network SN.

Such a unidirectional (from the real network RN to the simulation network SN) or bidirectional second interface 42 can be accessed not only by the real operator RO and the simulation operator SO who can also access the first interface 41, but also by the participant in the simulation network SN for inputting and/or outputting various information. The participant in the simulation network SN is any general participant, who may be an individual or a non-individual (or non-personal) legal entity or organization. In the example of the present embodiment, the corporate participant CP mainly accesses the second interface 42 (especially, the NEF in the simulation network SN described below).

It should be noted that the individual participant IP can also participate in the simulation network SN. The individual participant IP may participate in the simulation network SN through the second interface 42 in the similar manner to the corporate participant CP, but may participate as a user of the communication device 2 (UE) in the simulation network SN. The individual participant IP in such a case may participate in the simulation network SN using a real communication device 2 (UE) such as a smartphone that is actually used in the real network RN, or may access the communication device 2 (UE) that is virtually realized by software on the simulation network SN through a personal computer and the like.

The second interface 42 connects an information disclosure function that belongs to the 5GC in the real network RN and an information disclosure function that belongs to the 5GC in the simulation network SN. The information disclosure functions in the real network RN and the simulation network SN may be, for example, existing network functions such as the NEF or newly established functions in the future core network. The NEF (Network Exposure Function) is a network function that provides an application programming interface (API) to various functions in the 5GC. A general participant in the simulation network SN (e.g., the corporate participant CP) may, for example, access the NEF that constitutes the second interface 42 in the simulation network SN to directly input or output various information with the simulation network SN. It should be noted that, although it is assumed that similar functions to the NEF may be provided under different names in other wireless communication systems, including those of generations later than 5G, such similar functions may be utilized in the present embodiment instead of or in addition to the NEF.

Since the NEF is provided so that application software running outside the 5GC can access functions or information within the 5GC, the network state information shared on the second interface 42 including the NEF, is less confidential than the network operation information shared on the first interface 41. Therefore, even if access to the second interface 42 by a general participant (e.g., the corporate participant CP) in the simulation network SN is allowed, there is less concern in terms of security or confidentiality. Examples of the network state information shared on the second interface 42 include any information that can be accessed through the existing NEF, and various information used in conducting a virtual event described below on the simulation network SN (however, highly confidential information will be shared on the first interface 41). The simulation network SN can effectively simulate the real network RN and conduct a virtual event and the like described below, by utilizing the network state information or other information received through the second interface 42 from the real network RN and/or the general participant such as the corporate participant CP.

The virtual event generator 34 generates a virtual event in the simulation network SN operating based on the network operation information provided by the network operation information provider 32 through the first interface 41 and/or the network state information provided by the network state information provider 33 through the second interface 42. It is preferable that the virtual event generated in the simulation network SN by the virtual event generator 34 is an event that is likely to take place also in the real network RN. For example, disasters, incidents, accidents, communication failures, large-scale updates, autonomous driving of vehicles or drones, and the like, which are likely to occur in the real network RN, are virtually conducted by the virtual event generator 34 as the virtual events in the simulation network SN.

The virtual event recorder 35 records the behavior of the simulation network SN and/or the general participant such as the corporate participant CP or the individual participant IP, during the virtual event conducted in the simulation network SN by the virtual event generator 34. Based on such a record, the impact on each portion in the real network RN such as the NG-RAN or the 5GC, or the behavior of typically a large number of UEs (i.e., general users) connected to the NG-RAN can be effectively simulated, which are assumed in case a disaster, an incident, an accident, a communication failure, a large-scale update, autonomous driving of a vehicle or a drone, or the like actually occurs in the real network RN, which has been conducted as the virtual event.

Then, considering the result of such a simulation, countermeasures can be prepared in advance for the case where a disaster, an incident, an accident, a communication failure, a large-scale update, autonomous driving of a vehicle or a drone, or the like actually takes place in the real network RN. For example, if it has been observed that access or traffic from UEs has been excessively concentrated at a specific base station in the NG-RAN, during a disaster conducted as the virtual event in the simulation network SN, countermeasures can be prepared in advance, such as restricting access of a UE to the corresponding base station, urging a UE to access another base station in the vicinity of such base station, and the like, when a disaster actually occurs in the real network RN.

In addition to or instead of the recording of the virtual event by the virtual event recorder 35, the network operation information provider 32 may provide the behavior of the simulation network SN and/or the general participant during the virtual event conducted in the simulation network SN by the virtual event generator 34, through the first interface 41 (e.g., the analysis information interface 412) to the analysis function (e.g., the NWDAF) in the real network RN. The analysis function in the real network RN, which may be the AI/ML function, may analyze the behavior of the simulation network SN and/or the general participant observed during the virtual event in the simulation network SN, and autonomously generate countermeasures for the case where a similar event actually occurs in the real network RN.

It should be noted that at least some of the behavior of the simulation network SN and/or the general participant observed during the virtual event in the simulation network SN, may be provided to the real network RN through the second interface 42. However, since it may include sensitive information concerning the network operation or the individual participant, it is preferable that it is provided to the real network RN through the secure first interface 41.

As described above, in the present embodiment, in addition to the second interface 42 such as the NEF, to which access by a general participant in the simulation network SN is allowed, the first interface 41 is provided, to which access by the real operator RO and the simulation operator SO is allowed and access by the general participant in the simulation network SN is restricted. The highly confidential network operation information in the real network RN is securely provided to the simulation network SN, through the first interface 41 to which access by the general participant in the simulation network SN is restricted. As such, the simulation network SN can simulate the real network RN, based on the network operation information and/or the network state information provided from the real network RN through the first interface 41 and/or the second interface 42.

Besides, during the virtual event conducted by the virtual event generator 34 in the simulation network SN, the real network RN is virtually reproduced based on the network operation information and/or the network state information provided through the first interface 41 and/or the second interface 42, and then real-time input is obtained from the general participant such as the corporate participant CP or the individual participant IP through the second interface 42 (especially, the NEF in the simulation network SN) or a UE in the simulation network SN. As such, according to the present embodiment, the virtual event which is highly reproducible or realistic in the real network RN can be effectively conducted in the simulation network SN.

Figure 3:
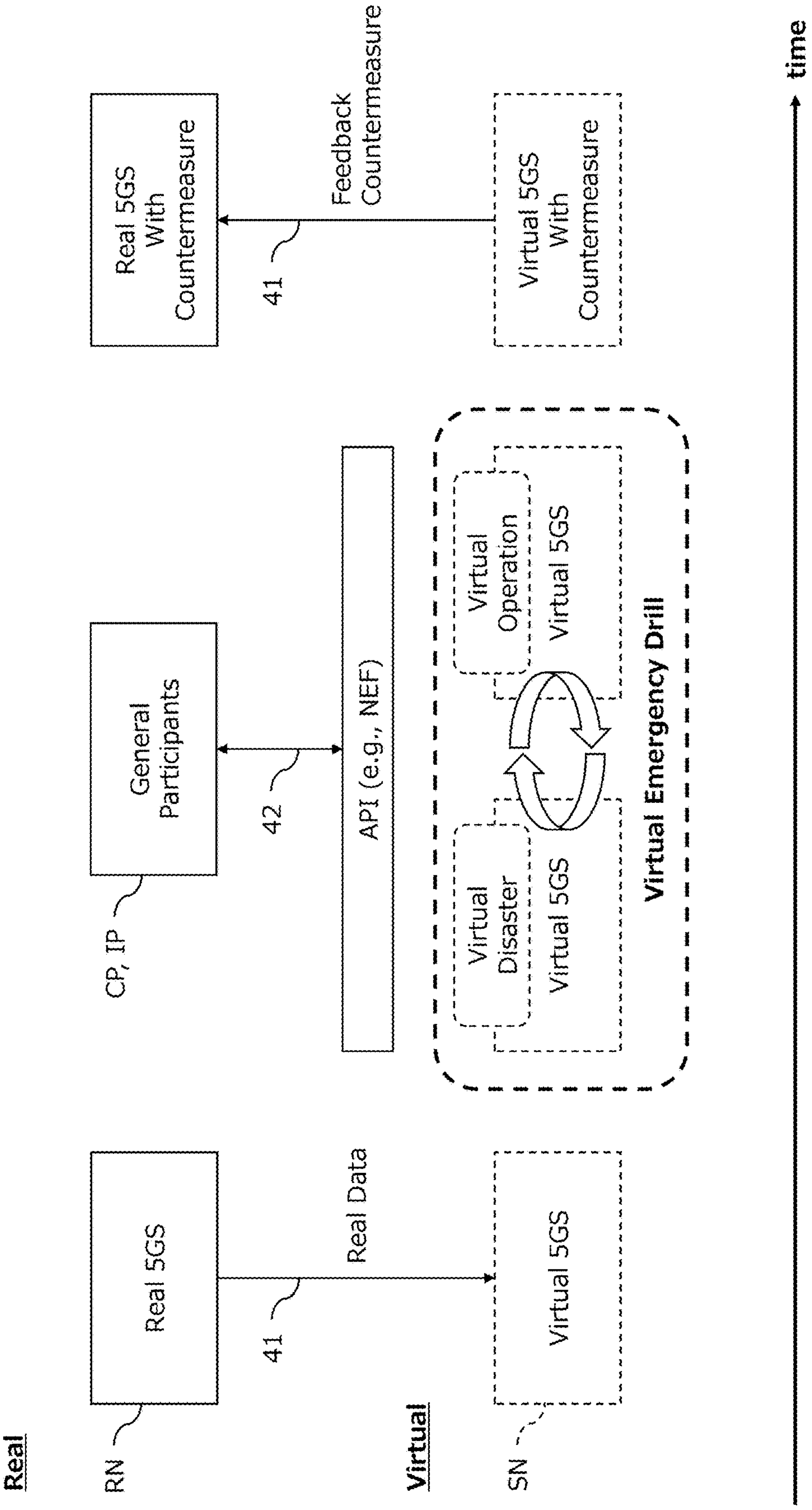
FIG. 3 schematically shows an example of a virtual event that a virtual event generator generates in a simulation network.

FIG. 3 schematically shows an example of a virtual event conducted by the virtual event generator 34 in the simulation network SN. The virtual event in the present example is a virtual emergency drill organized by the simulation operator SO such as country or local government, under the support by the real operator RO such as an MNO or an MVNO. Such a virtual emergency drill virtually makes a disaster occur in the simulation network SN, which is likely in the real network RN.

First, the network operation information provider 32 provides the network operation information (Real Data) such as the OAM information in the real network RN (Real 5GS (5G System)), through the first interface 41 to the simulation network SN (Virtual 5GS). The simulation network SN virtually simulates or reproduces the real network RN based on the received network operation information.

Subsequently, the virtual event generator 34 initiates the virtual emergency drill in the simulation network SN. As schematically illustrated in the figure, the virtual emergency drill is configured by a virtual disaster caused virtually in the simulation network SN by the virtual event generator 34, and the operation or the behavior (Virtual Operation) of the simulation network SN in response to the virtual disaster.

The general participants such as the corporate participant CP or the individual participant IP also participate in the virtual emergency drill, through the second interface 42 or UEs in the simulation network SN. The general participants (especially, the UEs) are provided with information of the virtual disaster (e.g., information that an earthquake of magnitude 6 has occurred, or information of the caused damages), and also provided with communication services from the simulation network SN with degraded quality due to the damages caused by the virtual disaster. In such a way, by understanding the actions taken toward the simulation network SN by the general participants placed in the situation similar to an actual disaster, the corresponding behaviors of the UEs (e.g., moving locations, disconnecting from the network, reconnecting to the network), and/or the behavior or the impact of the simulation network SN (e.g., excessive concentration of access from the UEs to a specific base station in the NG-RAN, or emergency stop of specific network equipment due to overload and the like), the virtual emergency drill can be conducted with high quality.

In the example shown in the figure, the simulation network SN where the virtual emergency drill has been conducted, autonomously generates countermeasures for the virtual disaster, by utilizing its own analysis function such as the NWDAF. Such countermeasures and other feedback are provided by the network operation information provider 32, through the first interface 41 from the simulation network SN to the real network RN. The real network RN may adopt such countermeasures for the virtual disaster provided from the simulation network SN as are, or it may make necessary changes by utilizing its own analysis function such as the NWDAF. It should be noted that the countermeasures for the virtual disaster generated by the simulation network SN and/or the real network RN, may be applied in another virtual emergency drill to confirm their effectiveness. Through a series of such virtual emergency drills, the countermeasures for the virtual disaster are effectively improved or optimized.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A communication control apparatus comprising at least one processor that performs:
   by a simulation network provider, providing a simulation network that simulates a real mobile communication network; and
   by a network operation information provider, providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.
2. The communication control apparatus according to item 1, wherein the first interface has an OAM information interface that provides OAM information in the mobile communication network as the network operation information, from the mobile communication network to the simulation network.
3. The communication control apparatus according to item 2, wherein the OAM information interface connects an OAM function in the mobile communication network and an OAM function in the simulation network.
4. The communication control apparatus according to any of items 1 to 3, wherein the first interface has an analysis information interface that provides analysis information in the mobile communication network as the network operation information, from the mobile communication network to the simulation network.
5. The communication control apparatus according to item 4, wherein the analysis information interface connects an analysis function in the mobile communication network and an analysis function in the simulation network.
6. The communication control apparatus according to item 5, wherein the analysis functions in the mobile communication network and the simulation network are configured by artificial intelligence having machine learning capability.
7. The communication control apparatus according to any of items 1 to 6, wherein the at least one processor performs, by a virtual event generator, generating a virtual event in the simulation network operating based on the network operation information.
8. The communication control apparatus according to item 7, wherein the network operation information provider provides the behavior of the simulation network during the virtual event, to an analysis function in the mobile communication network through the first interface.
9. The communication control apparatus according to item 7 or 8, wherein the at least one processor performs, by a virtual event recorder, recording the behavior of the simulation network during the virtual event.
10. The communication control apparatus according to any of items 1 to 9, wherein the network operation information provider provides the network operation information used for operation of the mobile communication network, through the first interface from the simulation network to the mobile communication network.
11. The communication control apparatus according to any of items 1 to 10, wherein the simulation network is provided with a second interface to which access by the participant in the simulation network is allowed.
12. The communication control apparatus according to item 11, wherein the second interface accepts an input to the simulation network by the participant in the simulation network.
13. The communication control apparatus according to item 11 or 12, wherein the at least one processor performs, by a network state information provider, providing network state information other than the network operation information that simulates the state in the mobile communication network in the simulation network, through the second interface from the mobile communication network to the simulation network.

14. The communication control apparatus according to item 13, wherein the network state information provider provides the network state information indicating the state in the simulation network, through the second interface from the simulation network to the mobile communication network.

15. The communication control apparatus according to any of items 1 to 14, wherein the operator of the mobile communication network and the operator of the simulation network are different.

16. The communication control apparatus according to item any of items 1 to 15, wherein access to the first interface by the participant in the simulation network is prohibited.

17. A communication control method performing: providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

18. A computer-readable medium storing a communication control program causing a computer to perform:

providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

The application claims priority of Japanese patent application 2023-015626, filed on Feb. 3, 2023, which is hereby incorporated by reference in its entirety.

The present disclosure relates to providing simulation network that simulates real mobile communication network.

1 wireless communication system, 2 communication device, 3 communication control apparatus, 11 5G wireless communication system, 12 4G wireless communication system, 13 satellite communication system, 31 simulation network provider, 32 network operation information provider, 33 network state information provider, 34 virtual event generator, 35 virtual event recorder, 41 first interface, 42 second interface, 111 5G base station, 112 5G cell, 121 4G base station, 122 4G cell, 131 communication satellite, 132 satellite communication cell, 133 gateway, 411 OAM information interface, 412 analysis information interface, 413 other information interface.

What is claimed is:

1. A communication control apparatus comprising at least one processor that performs:

by a simulation network provider, providing a simulation network that simulates a real mobile communication network; and by a network operation information provider, providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

2. The communication control apparatus according to claim 1, wherein the first interface has an OAM information interface that provides OAM information in the mobile communication network as the network operation information, from the mobile communication network to the simulation network.

3. The communication control apparatus according to claim 2, wherein the OAM information interface connects an OAM function in the mobile communication network and an OAM function in the simulation network.

4. The communication control apparatus according to claim 1, wherein the first interface has an analysis information interface that provides analysis information in the mobile communication network as the network operation information, from the mobile communication network to the simulation network.

5. The communication control apparatus according to claim 4, wherein the analysis information interface connects an analysis function in the mobile communication network and an analysis function in the simulation network.

6. The communication control apparatus according to claim 5, wherein the analysis functions in the mobile communication network and the simulation network are configured by artificial intelligence having machine learning capability.

7. The communication control apparatus according to claim 1, wherein the at least one processor performs, by a virtual event generator, generating a virtual event in the simulation network operating based on the network operation information.

8. The communication control apparatus according to claim 7, wherein the network operation information provider provides the behavior of the simulation network during the virtual event, to an analysis function in the mobile communication network through the first interface.

9. The communication control apparatus according to claim 7, wherein the at least one processor performs, by a virtual event recorder, recording the behavior of the simulation network during the virtual event.

10. The communication control apparatus according to claim 1, wherein the network operation information provider provides the network operation information used for operation of the mobile communication network, through the first interface from the simulation network to the mobile communication network.

11. The communication control apparatus according to claim 1, wherein the simulation network is provided with a second interface to which access by the participant in the simulation network is allowed.

12. The communication control apparatus according to claim 11, wherein the second interface accepts an input to the simulation network by the participant in the simulation network.

13. The communication control apparatus according to claim 11, wherein the at least one processor performs, by a network state information provider, providing network state information other than the network operation information that simulates the state in the mobile communication network in the simulation network, through the second interface from the mobile communication network to the simulation network.

14. The communication control apparatus according to claim 13, wherein the network state information provider provides the network state information indicating the state in the simulation network, through the second interface from the simulation network to the mobile communication network.

15. The communication control apparatus according to claim 1, wherein the operator of the mobile communication network and the operator of the simulation network are different.

16. The communication control apparatus according to claim 1, wherein access to the first interface by the participant in the simulation network is prohibited.

17. A communication control method performing:

providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

18. A non-transitory computer-readable medium storing a communication control program causing a computer to perform:

providing a simulation network that simulates a real mobile communication network; and providing network operation information used for operation of the simulation network, from the mobile communication network to the simulation network, through a first interface to which access by an operator of the mobile communication network and an operator of the simulation network is allowed, and access by a participant in the simulation network who is different from each of the operators is restricted.

* * * * *